Patented June 29, 1926.

1,590,697

UNITED STATES PATENT OFFICE.

PIERRE PIPEREAUT AND ANDRÉ HELBRONNER, OF PARIS, FRANCE.

MANUFACTURE OF TITANIC AND ZINC COMPOUNDS.

No Drawing. Application filed November 21, 1923, Serial No. 676,177, and in France November 25, 1922.

The present invention relates to a dry process for manufacturing titanium-zinc compounds of definite molecular composition; these compounds result from the reciprocal action of two compounds, viz $ZnSO_4$, and $TiS_2$.

The manufacture of $ZnSO_4$ is known.

According to the present invention, $TiS_2$ is obtained by a new treatment in a furnace, that is at high temperature, from ferrotitanic ores such as ilmenite, and transformed into $TiO_2$ and chemical combinations of the latter such as $(TiO_2\ ZnO)$ and $(TiO_2)_2(ZnO)_3$ by dry process.

Said ores, finely ground, with the addition of concentrated sulphuric acid and an excess of carbon are heated to red heat in an oven to which air has no access.

Under such conditions the iron contained in the ores is transformed into iron sulphide FeS. When the operation is terminated, the mass is withdrawn from the oven, pulverized, and sulphuric acid at 20° Baumé is poured into the pulverized mixture and the whole is heated. Sulphuretted hydrogen evolves, the FeS is converted into soluble ferrous sulphate, whereas the titanic oxides remain as insoluble substances. These nearly pure titanic oxides are converted, according to known processes, first into $TiCl_4$ or the like halogen compounds and then into $TiS_2$ by the action of sulphuretted hydrogen.

The $TiS_2$ thus obtained is pulverized, mixed with dry $ZnSO_4$ or the like oxide of zinc compound and the mixture is heated to red heat, within an oven, which is first closed, that is, in a reducing atmosphere.

The following reactions occur, according to the relative molecular proportions of both substances:

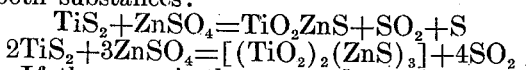
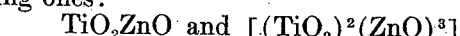

If the oven is then opened to the outer air, the obtained ingredients are the following ones:

$TiO_2ZnO$ and $[(TiO_2)^2(ZnO)^3]$

Produced according to formal chemical reactions, the resulting chemical combinations are well defined molecular substances.

The above industrial process for preparing the two white pigments $TiO_2ZnO$ and $(TiO_2)_2(ZnO)_3$ by dry process, in well defined molecular proportion, preferably used in mixture, by starting from titanic ores, forms the object of the present invention. It is understood that such substances may be prepared by known wet processes; the resulting compounds however cannot be used as pigments.

Having now fully described our said invention, what we claim and desire to secure by Letters Patents, is:—

1. A process for manufacturing white pigments by a dry process, wherein dry titanic sulphide obtained in a known manner from ilmenite is mixed with dry $ZnSO_4$, the mixture being heated to red heat and calcinated within a closed oven.

2. A process for manufacturing white pigments by a dry process, wherein dry titanic sulphide, obtained in a known manner from ilmenite, is mixed with dry $ZnSO_4$ in the molecular proportion substantially of 1 to 1, the mixture being heated to red heat and calcinated within a closed oven.

PIERRE PIPEREAUT.
ANDRÉ HELBRONNER.